United States Patent
Englund et al.

(10) Patent No.: US 8,401,561 B2
(45) Date of Patent: Mar. 19, 2013

(54) METHOD AND ARRANGEMENT IN A TELECOMMUNICATION SYSTEM

(75) Inventors: Eva Englund, Linköping (SE); Pål Frenger, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 598 days.

(21) Appl. No.: 12/531,716

(22) PCT Filed: Oct. 16, 2007

(86) PCT No.: PCT/SE2007/050743
§ 371 (c)(1),
(2), (4) Date: Sep. 17, 2009

(87) PCT Pub. No.: WO2008/115112
PCT Pub. Date: Sep. 25, 2008

(65) Prior Publication Data
US 2010/0041410 A1   Feb. 18, 2010

(30) Foreign Application Priority Data

Mar. 22, 2007   (SE) ........................ 0700736

(51) Int. Cl.
*H04W 72/00* (2009.01)
(52) U.S. Cl. .......... 455/450; 370/329; 370/348
(58) Field of Classification Search .......... 455/450, 455/509–511, 67.7, 68, 701, 221, 451, 452.1, 455/452.2; 370/241, 328, 329, 330, 338, 370/341, 348, 431, 436–439, 459
See application file for complete search history.

(56) References Cited

U.S. PATENT DOCUMENTS

| 6,031,831 | A | 2/2000 | Tan boon et al. |
| 7,400,639 | B2* | 7/2008 | Madukkarumukumana et al. ........... 370/429 |
| 7,583,594 | B2* | 9/2009 | Zakrzewski ........... 370/229 |
| 7,986,959 | B2* | 7/2011 | Malladi et al. ........... 455/522 |

(Continued)

FOREIGN PATENT DOCUMENTS

| EP | 1871057 A1 | 12/2007 |
| WO | 98/59450 | 12/1998 |

(Continued)

OTHER PUBLICATIONS

3RD Generation Partnership Project. 3GPP TS 36.213, V8.3.0 (May 2008). 3rd Generation Partnership Project; Technical Specification Group Radio Access Network; Evolved Universal Terrestrial Radio Access (E-UTRA); Physical layer procedures (Release 8), May 2008.

*Primary Examiner* — Jinsong Hu
*Assistant Examiner* — Magdi Elhag
(74) *Attorney, Agent, or Firm* — Coats & Bennett, P.L.L.C.

(57) ABSTRACT

In a method of improved channel-sounding transmissions between a base station in communication with a user equipment in a telecommunication system, the user equipment receiving (S0) an assigned channel-sounding transmission pattern from the base station, and transmitting (S1) a channel-sounding signal to the base station based on the assigned channel-sounding transmission pattern and on available uplink data at the user equipment.

15 Claims, 7 Drawing Sheets

U.S. PATENT DOCUMENTS

| | | | |
|---|---|---|---|
| 2001/0015956 A1* | 8/2001 | Ono | 370/229 |
| 2004/0160916 A1* | 8/2004 | Vukovic et al. | 370/332 |
| 2006/0034165 A1* | 2/2006 | Levy | 370/208 |
| 2006/0035643 A1* | 2/2006 | Vook et al. | 455/450 |
| 2006/0276228 A1* | 12/2006 | Jin et al. | 455/562.1 |
| 2007/0189408 A1* | 8/2007 | Waxman | 375/267 |
| 2007/0230373 A1* | 10/2007 | Li et al. | 370/267 |
| 2008/0032630 A1* | 2/2008 | Kim et al. | 455/45 |
| 2008/0165728 A1* | 7/2008 | Liu et al. | 370/329 |
| 2008/0182582 A1* | 7/2008 | Bachl et al. | 455/446 |
| 2008/0232240 A1* | 9/2008 | Baum et al. | 370/210 |
| 2009/0316811 A1* | 12/2009 | Maeda et al. | 375/260 |

FOREIGN PATENT DOCUMENTS

| | | |
|---|---|---|
| WO | 02/49306 A2 | 6/2002 |
| WO | 2008/041089 A2 | 4/2008 |
| WO | 2008/054322 A2 | 5/2008 |

* cited by examiner

METHOD AND ARRANGEMENT IN A TELECOMMUNICATION SYSTEM

TECHNICAL FIELD

The present invention relates to telecommunication systems in general, and specifically to uplink channel sounding transmissions using uplink multi-user scheduling in such systems.

BACKGROUND

Present tele- and data communication systems are a result of a development process since the late $19^{th}$ century. The technologies of the well-known 3GPP organization are the most widely spread in the world. Within the 3GPP work on standardization the concept of Long Term Evolution (LTE) is well under way. LTE enables a radio interface that is entirely optimized for IP transmissions, thus there is no need for support of circuit switched services. The LTE enables the uplink to support channel dependent scheduling in both time and frequency domains. Accordingly, an LTE uplink scheduler in the base station will estimate uplink channel quality based on so called uplink channel sounding transmissions from the User Equipments (UE) and possibly also on previous uplink data transmissions. Those channel-sounding transmissions are controlled by the eNodeB that assigns each user equipment with a channel sounding transmission pattern that determines when in time and where in frequency each UE shall transmit a channel sounding signal.

However, such channel sounding transmissions consume a significant amount of power from the User Equipment, and causes an increase in overhead signaling. Therefore, there is a need for methods and arrangements that enable a more efficient use of the uplink for channel-sounding transmissions.

SUMMARY

An object of the present invention is to provide improved uplink channel sounding transmissions.

Another object of the present invention is to enable more efficient uplink channel sounding transmissions.

A further object is to provide a method of improving the efficiency of the transmission of uplink channel sounding signals. In this context, "uplink channel sounding transmission" should be understood as any type of reference signal transmitted from the user equipment to the base station for uplink channel quality estimation.

According to a basic embodiment, a user equipment receives (S0) channel sounding transmission patterns from a network node, and subsequently transmits (S1) channel sounding signals to the network node based on the assigned pattern and on available uplink data in the user equipment.

According to a first aspect the user equipment only transmits channel sounding signals if there is available uplink data, i.e., the uplink data buffer is not empty.

According to a second aspect, the user equipment only transmits channel sounding signals if there is a predetermined amount of uplink data available, i.e. if there will still remain uplink data in the buffer after a system specific roundtrip time period.

Advantages of the present invention comprise:
Efficient uplink channel sounding transmissions
Decreased power consumption in the user equipment;
Decreased overhead signaling;
Decreased inter-cell interference;
Reduced load in uplink control channels.

BRIEF DESCRIPTION OF THE DRAWINGS

The invention, together with further objects and advantages thereof, may best be understood by referring to the following description taken together with the accompanying drawings, in which.

ABBREVIATIONS

3GPP Third Generation Partnership Project
BS Base Station
CQI Channel Quality Information
HARQ Hybrid Automatic Repeat reQuest
LTE Long Term Evolution
OFDM Orthogonal Frequency-Division Multiplexing
PUCCH Physical Uplink Control CHannel
UE User Equipment
UTRAN Universal Terrestrial Radio Access
WCDMA Wideband Code Division Multiple Access

DETAILED DESCRIPTION

The present invention will be described in the context of UTRAN LTE. However, it is equally applicable to other system technologies utilizing uplink multi-user scheduling with channel sounding.

Since the transmit buffers for the uplink are located in the UE, the eNodeB does not have sufficient information to optimize the transmissions of uplink channel sounding signals.

Figure 1:
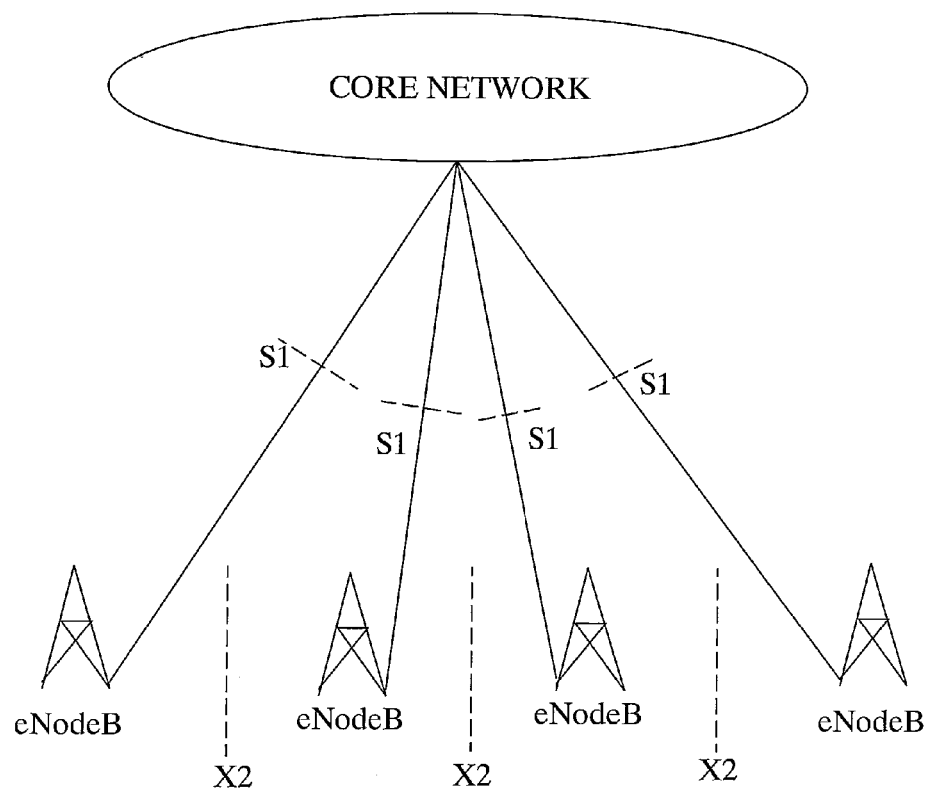
FIG. 1 is a schematic of a system in which the present invention is applicable.

FIG. 1 illustrates a general LTE radio access network in which the present invention can be utilized. They system comprises a set of base stations e.g. eNodeB connected to a core network via an S1 interface. Between the respective base stations there are further interfaces X2 that are only used between eNodeBs that have neighboring cells. Each eNodeB is in charge of a set of cells in which user equipment can be located. The eNodeB is responsible for RRM decisions, handover decisions, scheduling of users in both uplink and downlink in its cells etc. In addition, and obviously, the eNodeB also handles physical layer functions for coding, decoding, modulation, demodulation, interleaving, de-interleaving etc. Finally, each eNodeB also handles retransmission mechanisms, such as HARQ.

Figure 2:
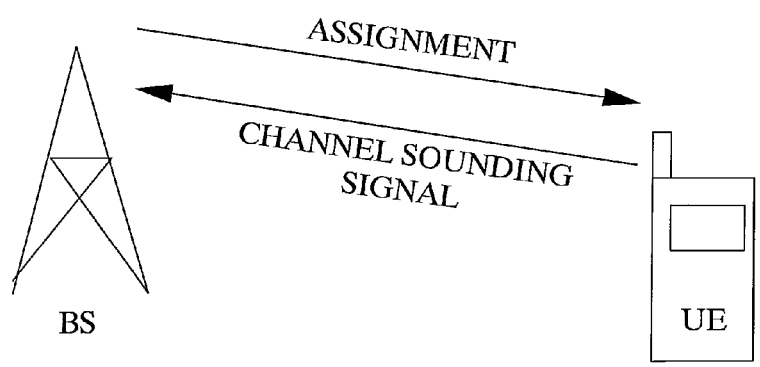
FIG. 2 is a general illustration of the uplink signaling in a LTE system.

FIG. 2 illustrates the signaling that takes place between a base station BS e.g. eNodeB and at least one user equipment UE in a cell belonging to that base station BS. As already mentioned in the background, the base station BS typically assigns channel sounding transmission patterns to certain user equipments UE in the system. According to prior art, the reception of such a pattern in a user equipment UE prompts or forces the user equipment to respond and transmit a channel sounding signal to enable determination of channel quality.

Since this transmission is mandatory, it causes an increase in overhead signaling in the system and especially increases the load in the uplink channel.

The invention recognizes the fact that channel-sounding signals are essentially only necessary if a user equipment actually has uplink data to transmit, e.g. there is available data in a buffer at the user equipment. However, as already mentioned, the channel sounding transmissions are controlled by the base station that itself has no knowledge of the transmission status e.g. if there is available uplink data, at the respective user equipment. Consequently, it would be useful with a method of reducing the channel sounding signal transmissions to instances when there is uplink data available at the user equipment.

According to a general form of the present invention, the channel sounding transmissions in such a system are controlled based on channel sounding pattern assignments and on available uplink data in the user equipment.

The present invention relates to a method where each user equipment in a communication system is adapted to not transmit channel sounding signals as instructed by a base station unless there is available uplink data in the user equipment.

Figure 3:
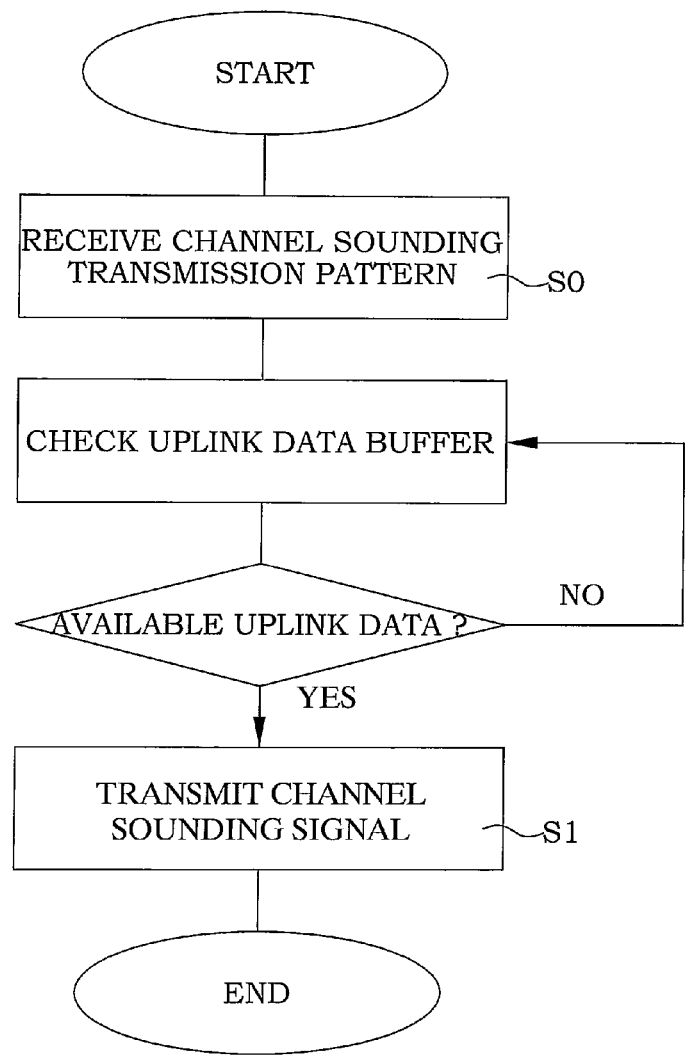
FIG. 3 is a schematic flow chart of an embodiment of a method in a user equipment according to the present invention.

With reference to FIG. 3, in an embodiment of a method in a user equipment in a communication system, the user equipment receives S0 an assigned channel sounding transmission pattern from a base station BS controlling its current uplink transmissions. The pattern provides information about which time and frequency slot that the user equipment should use for its transmissions. Subsequently, the user equipment transmits S1 a channel sounding signal to its base station BS based on its received channel sounding transmission pattern and on available uplink data in an internal buffer. An intermediate step in the user equipment UE enables the user equipment to check if there is any available data in its buffer. If there is no data available for transmission the user equipment can refrain from transmitting a channel sounding signal.

Figure 4:
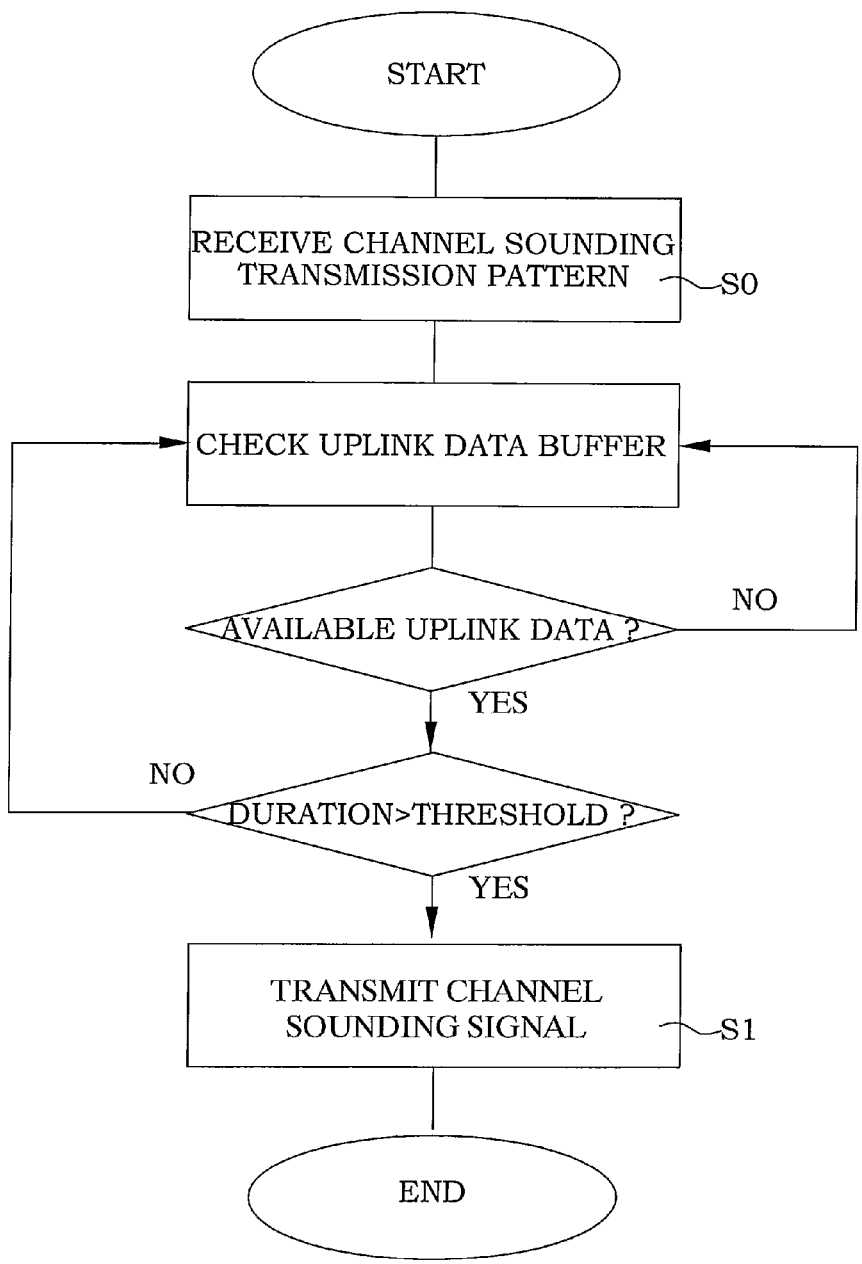
FIG. 4 is a schematic flow chart of a further embodiment of a method in a user equipment according to the present invention.

With reference to FIG. 4, according to a further embodiment of the method, the user equipment receives S0 an assigned channel sounding transmission pattern from a base station BS controlling its current uplink transmissions. The pattern provides information about which time and frequency slot that the user equipment should use for its transmissions. Subsequently, the user equipment checks if its uplink data buffer contains uplink data for transmission. In addition, the user equipment UE further checks the time duration of the available uplink data in the buffer. In more specific words, the user equipment UE checks if the buffer contains uplink data with a time duration exceeding a predetermined time interval e.g. a system specific Round-Trip Time (RTT). If the time duration does not exceed the RTT, in other words, if the buffer will become empty within one RTT, the user equipment can choose not to transmit the channel-sounding signal. Finally, if the buffer will not become empty within one RTT, then the user equipment transmits SI its channel sounding signal to the base station BS.

Consequently, the user equipment only transmits channel-sounding signals if the available uplink data has a duration that ensures that the buffer will still contain uplink data after a system specified round-trip time. Thereby, unnecessary channel sounding transmissions are avoided during periods when the user equipment does not have any or only a little available uplink data. Consequently, the power consumption of the user equipment is reduced. In addition, the interference that the user equipment generates for its neighboring cells is reduced.

Figure 5:
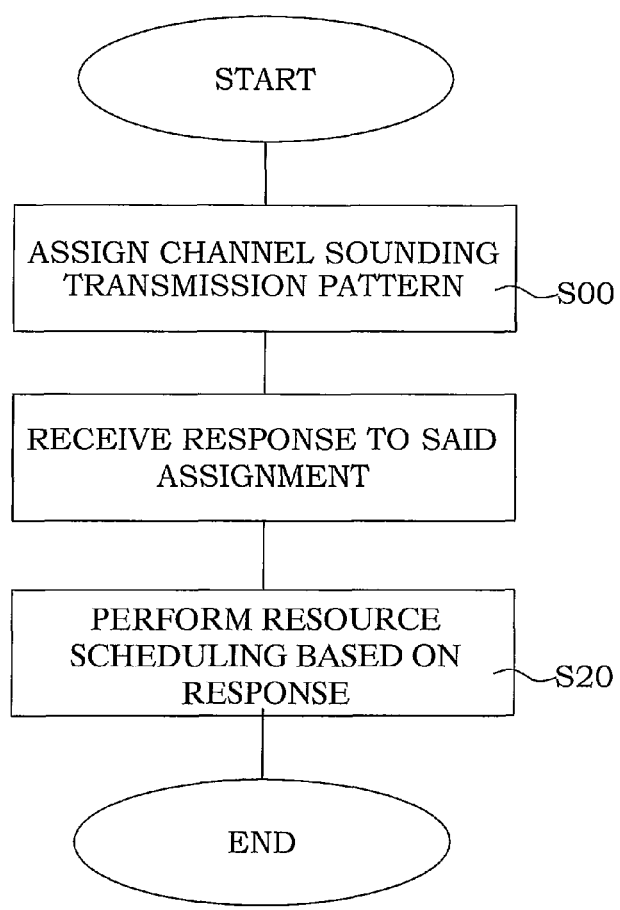
FIG. 5 is schematic flow chart of an embodiment of a method in a network node according to the present invention.

With reference now to FIG. 5, an embodiment of a method in a base station for improved channel sounding transmissions between the base station BS and a user equipment UE in a communication system will be described. Accordingly, a base station BS is adapted to S00 assigning channel sounding transmission patterns to user equipment UE in a communication system, and to perform S20 resource scheduling for the system based on a response to that assignment and optionally on available uplink data in the user equipment. The response can comprise reception of an actual channel-sounding signal, or the absence of an expected channel sounding signal.

According to a specific embodiment, the base stations are further adapted to interpret reception of a response in the form of a channel-sounding signal as an implicit scheduling request from that user equipment. Consequently, no specific separate scheduling request needs to be transmitted by a user equipment wanting allocated resources for transmission. A further consequence of this is that the user equipment may start to transmit channel sounding signals just before it wants to receive a grant, thus the uplink channel quality information of the channel sounding signal is up-to-date also for the first grant in an uplink transmission burst.

Figure 6:
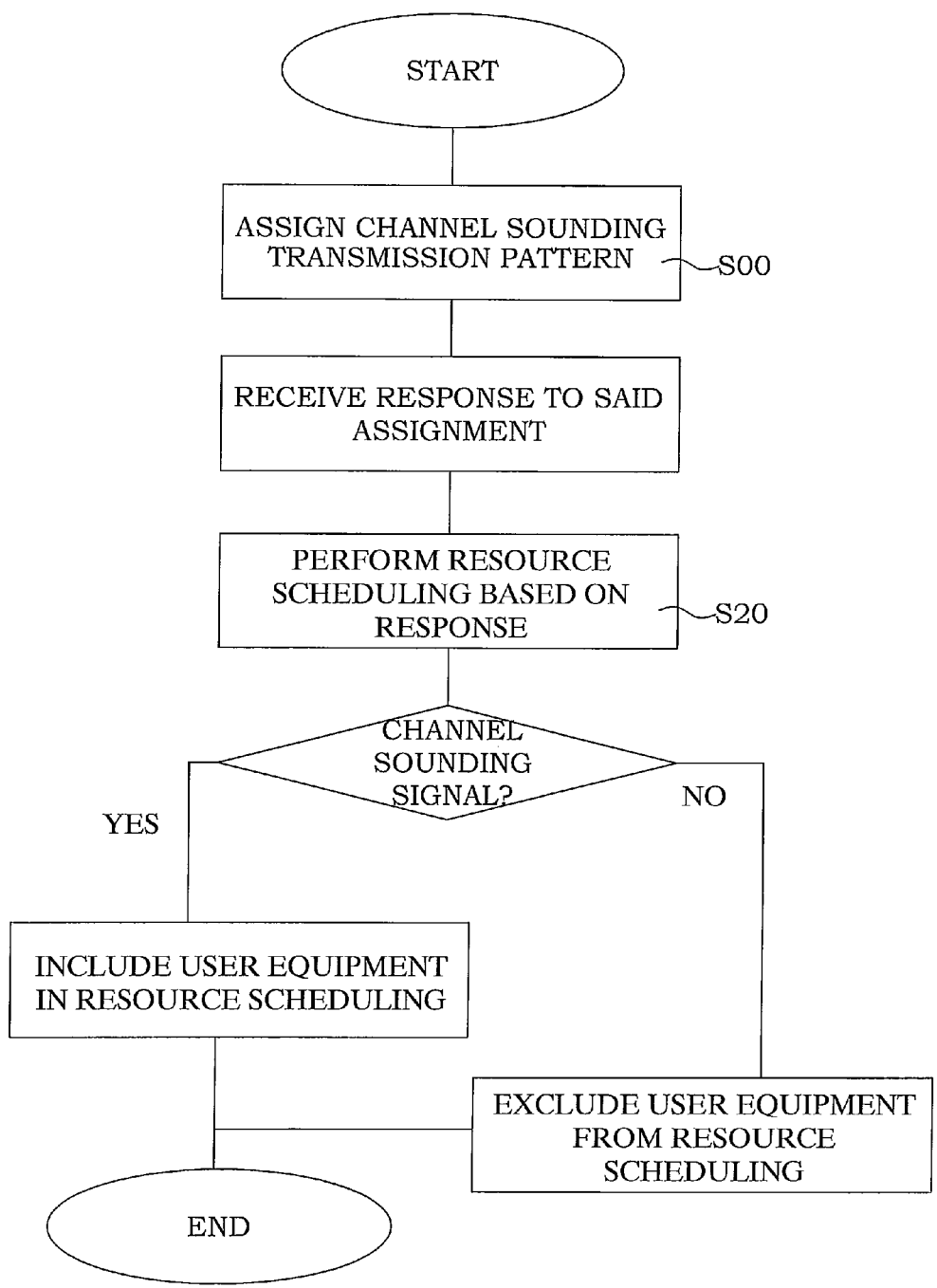
FIG. 6 is a schematic flow chart of a further embodiment of a method in a network node according to the present invention.

With reference to FIG. 6, the invention furthermore relates to a method in a network node e.g. base station for receiving uplink channel sounding signaling from a user equipment. The method comprises the step of interpreting the absence of one or more expected uplink channel sounding signals as an indication of empty transmit buffers for uplink data of that user equipment, i.e. that the user equipment has no uplink data to transmit. Thus, in case the base station does not have to consider the corresponding user equipment in the uplink-scheduling algorithm.

When the user equipment, after having stopped transmitting channel-sounding signals, detects that there is new uplink data to be transmitted again it can start to transmit the channel-sounding signal again.

Consequently, the base station can be adapted to interpret the re-starting of channel sounding transmissions from the user equipment as an implicit scheduling request. Thus, a user equipment that is assigned a channel sounding transmission pattern does not have to use the dedicated physical uplink control channel (PUCCH) for transmitting scheduling requests. As long as a user equipment is transmitting channel sounding signals the base station knows that that specific user equipment has more uplink data to transmit. This reduces load on the physical uplink control channel (i.e. the channel used for transmitting scheduling requests). Furthermore, by transmitting a channel sounding signal as an implicit scheduling request the uplink scheduler in the base station will have newly updated uplink channel quality estimate to use when performing channel dependent link adaptation and scheduling also on the first granted transmission from the user equipment.

According to a specific embodiment of the invention, a plurality of user equipments in communication with the base station can be arranged to handle channel-sounding transmissions and channel scheduling requests in different ways. Thus a set of user equipments that have a scheduling request resource on the physical uplink control channel may be completely non-overlapping with a set of user equipment that are assigned a dedicated channel sounding resource. A user equipment that receives a dedicated channel sounding resource may then automatically know that it is no longer allowed to transmit on its previously dedicated scheduling request resource and the base station is free to assign that scheduling request resource to another user equipment. In addition, a user equipment that has a channel sounding resource assigned, may automatically release the channel sounding resource when it is assigned a dedicated scheduling request resource.

In the following, an embodiment of the invention in relation to LTE will be described.

Figure 7:
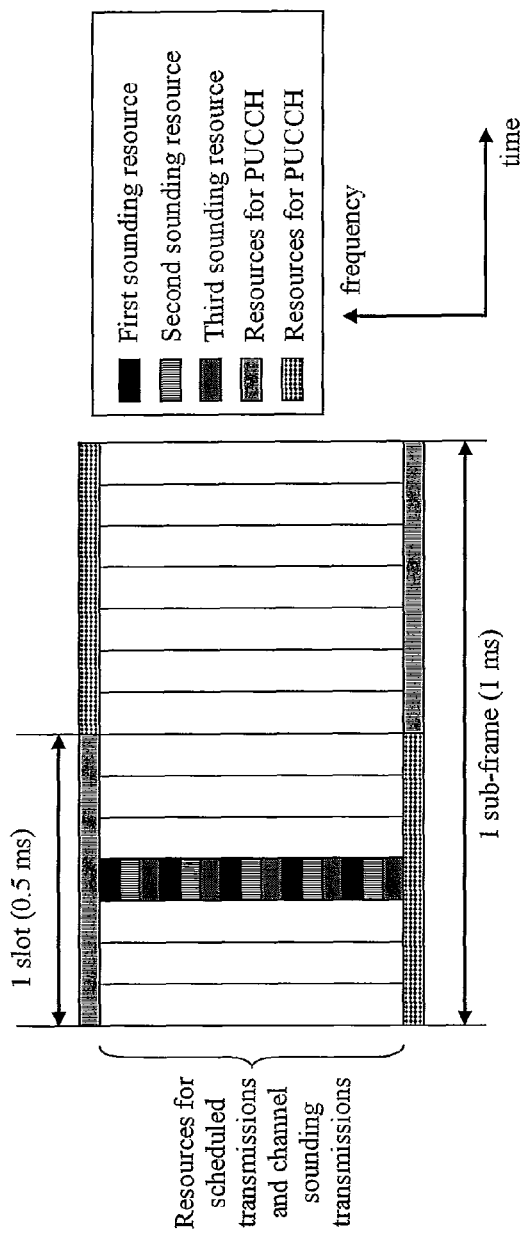
FIG. 7 is a schematic of the LTE uplink physical resources.

FIG. 7 illustrates how the LTE uplink radio resources may be used. The physical uplink control channel (PUCCH) resources are positioned at the frequency edges. The shared uplink resource used for scheduled transmissions of user data consists of the remaining time and frequency resources. In some of the uplink slots there are also channel sounding resources. The channel sounding resources can be transmitted using a distributed frequency mapping to allow several user equipment (UE) to transmit orthogonal uplink channel sounding signals over the full bandwidth in the same OFDM symbol. Several users are assigned a small portion of the PUCCH resources for transmission of e.g. CQI report, HARQ feedback, and scheduling requests. A few users may also be assigned channel sounding resources.

According to the invention, a user equipment that is assigned an uplink channel sounding resource sends information of the uplink buffer status on this channel sounding resource by means of on-off signaling, i.e. the user equipment only transmits an uplink sounding signal on an assigned channel sounding resource when it also has data to transmit.

In addition, a user equipment that has been assigned a dedicated scheduling request resource on the physical uplink control channel releases that scheduling request resource if it is assigned a channel sounding resource. The eNodeB may then assign the corresponding scheduling request resource to another user equipment.

Furthermore, a user equipment that is assigned an uplink channel sounding resource will release that resource if it is assigned a scheduling request resource. The eNodeB may then assign the corresponding scheduling request resource to another user equipment.

Furthermore, a user equipment that is assigned an uplink channel sounding resource will release that resource if it is assigned a scheduling request resource on the physical uplink control channel. The eNodeB may then assign the corresponding uplink channel sounding resource to another user equipment.

Figure 9:
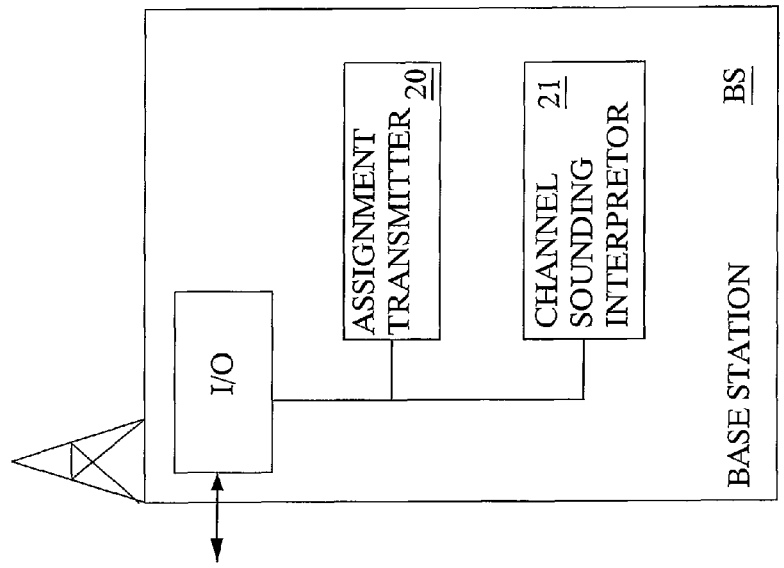
FIG. 9 is a schematic block diagram of an embodiment of a network node according to the present invention.
Figure 8:
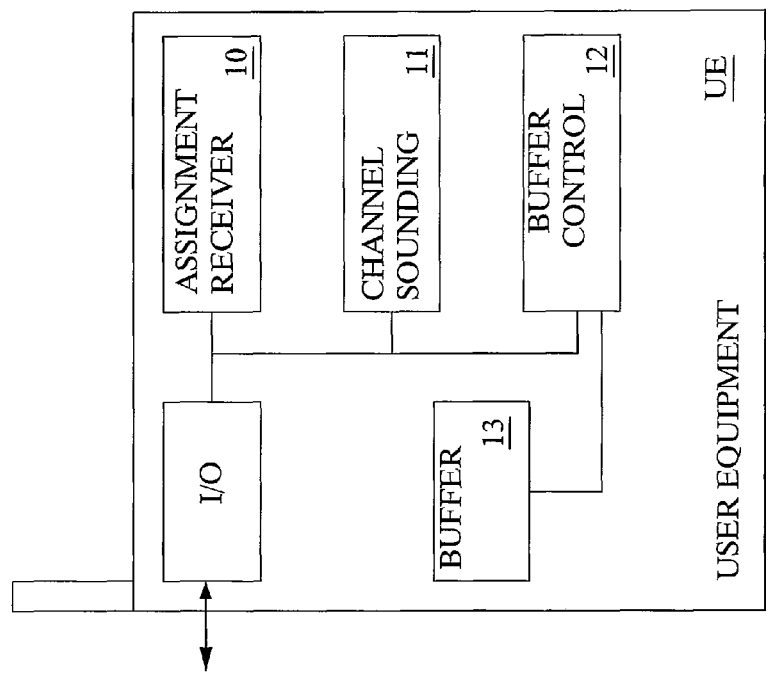
FIG. 8 is a schematic block diagram of an embodiment of a user equipment according to the present invention.

With reference to FIG. 8 and FIG. 9, embodiments of a user equipment UE and a base station BS according to the present invention will be described.

The user equipment obviously comprises necessary functionalities of prior art, which will not be described further. Instead, a general form of address will be used. As such, the user equipment UE comprises a conventional input/output unit I/O for receiving and transmitting information, further the user equipment comprises a receiving unit 10 for receiving and processing channel sounding transmission assignments from a base station BS. Further, the user equipment comprises a transmitting unit 11 for transmitting channel sounding signals to the base station based on the assigned channel sounding transmission pattern and on available uplink data in a buffer 13. In addition, the user equipment comprises a control unit 12 for monitoring the content of the buffer 13.

The transmitting unit 11 is further adapted to transmit channel sounding signals if there is uplink data available in the buffer, and additionally only if the buffer will not become empty within one system specific round-trip time.

The base station BS comprises a unit 20 for assigning the channel sounding transmission patterns to certain user equipments in the system, and a unit for receiving 21 channel-sounding signals based on the assigned pattern and on available uplink data in the user equipment. These receiving means 21 are adapted to interpret a response comprising an absence of an expected channel-sounding signal as an indication of lack of uplink data for transmission and to enable resource scheduling without regard to the user equipment. The receiving means 21 are further adapted to interpret a response in the form of an actual channel-sounding signal as an indication of a scheduling request, e.g. there is uplink data for transmission from the user equipment.

The user equipment UE and base stations BS are further adapted to enable the aforementioned method according to the invention.

Even though the invention in the foregoing has been described in relation to UTRAN Long Term Evolution (LTE), it could be applied to other systems utilizing multi-user scheduling where applicable.

It will be understood by those skilled in the art that various modifications and changes may be made to the present invention without departure from the scope thereof, which is defined by the appended claims.

The invention claimed is:

1. A method of improved channel sounding transmissions between a base station in communication with a user equipment in a telecommunication system, said method comprising:
    receiving sounding signals at a base station, as sent by one or more user equipments (UEs) that are configured to send sounding signals when they have uplink data to transmit and not send sounding signals when they do not have uplink data to transmit; and
    further at the base station, scheduling uplink resources based at least in part on interpreting a re-starting of sounding signal transmission by a given user equipment as an implicit indication that the given user equipment has uplink data to transmit, and interpreting the stopping of sounding signal transmission by a given user equipment as an implicit indication that the given user equipment does not have uplink data to transmit.

2. A method of improved channel sounding transmissions between a base station in communication with a user equipment in a telecommunication system, the method being implemented by the user equipment and comprising:
    receiving an assigned channel sounding transmission pattern from said base station; and
    transmitting a channel sounding signal to said base station based on said assigned channel sounding transmission pattern and on available uplink data in said user equipment.

3. The method according to claim 2, wherein transmitting the channel sounding signal based on said assigned sounding transmission pattern and on available uplink data comprises said user equipment transmitting said channel sounding signal if there is uplink data available for transmission in an uplink data buffer.

4. The method according to claim 3, wherein transmitting the channel sounding signal based on said assigned sounding transmission pattern and on available uplink data comprises said user equipment not transmitting said channel sounding signal if said uplink data buffer is empty.

5. The method according to claim 3, further comprising:
    comparing the time duration of the available uplink data to a predetermined threshold value; and
    transmitting the channel sounding signal if said duration is larger than said threshold value.

6. The method according to claim 5, further comprising said user equipment not transmitting said channel sounding signal if said uplink data buffer will become empty within said predetermined threshold value.

7. The method according to claim 6, wherein said predetermined threshold value corresponding to a Round Trip Time (RTT) representative for the telecommunication system.

8. A method of improved channel sounding transmissions between a base station in communication with a user equipment in a telecommunication system, said method being implemented by the base station and comprising:
   assigning a channel sounding transmission pattern to said user equipment; and
   performing resource scheduling for said system based at least on a response to said assignment;
   wherein said performing resource scheduling comprises interpreting reception of a response comprising a transmitted channel sounding signal from said user equipment as an implicit scheduling request.

9. The method of claim 8, further comprising:
   if a response from a UE does not include an expected channel sounding signal transmission:
      interpreting the absence of the expected channel sounding signal transmission as an indication that there is no available uplink data at said user equipment; and
      performing uplink resource scheduling without considering said user equipment.

10. A user equipment in a telecommunication system, said user equipment comprising:
   a receiver unit for receiving assigned channel sounding transmission patterns from a base station; and
   a transmitter unit for transmitting channel sounding signals to said base station based on said assigned channel sounding transmission pattern and on available uplink data in said user equipment.

11. The user equipment in claim 10, wherein the user equipment includes a control unit for determining if there is available uplink data for transmission, and wherein the transmit unit is configured to only transmit said channel sounding signal if there is available uplink data.

12. The user equipment in claim 11, wherein the control unit is further configured to compare the time duration of available uplink data and a predetermined threshold value, and the transmit unit is configured to only transmit said channel sounding signal if said time duration is larger than said predetermined threshold.

13. A base station in a telecommunication network, said base station comprising:
   an assignment unit for assigning channel sounding patterns to user equipment in said network;
   a receiving unit for receiving channel sounding signals based on said channel sounding patterns and available uplink data in said user equipment; and
   a scheduler associated with the receiving unit, the scheduler being configured to interpret the reception of a channel sounding signal as an implicit scheduling request from said user equipment.

14. The base station according to claim 13, wherein the scheduler is further configured to interpret the absence of an expected channel sounding signal as an indication that there is no available uplink data, and to perform uplink resource scheduling without considering said user equipment.

15. The base station according to claim 13, wherein said base station comprises an eNodeB.

* * * * *

UNITED STATES PATENT AND TRADEMARK OFFICE
CERTIFICATE OF CORRECTION

PATENT NO.        : 8,401,561 B2
APPLICATION NO.   : 12/531716
DATED             : March 19, 2013
INVENTOR(S)       : Englund et al.

It is certified that error appears in the above-identified patent and that said Letters Patent is hereby corrected as shown below:

In the Specifications:

In Column 3, Line 54, delete "SI" and insert -- S1 --, therefor.

Signed and Sealed this
Sixth Day of August, 2013

Teresa Stanek Rea
*Acting Director of the United States Patent and Trademark Office*